M. H. DUNHAM.
GEARING.
APPLICATION FILED MAY 6, 1913.
1,190,131.  Patented July 4, 1916.
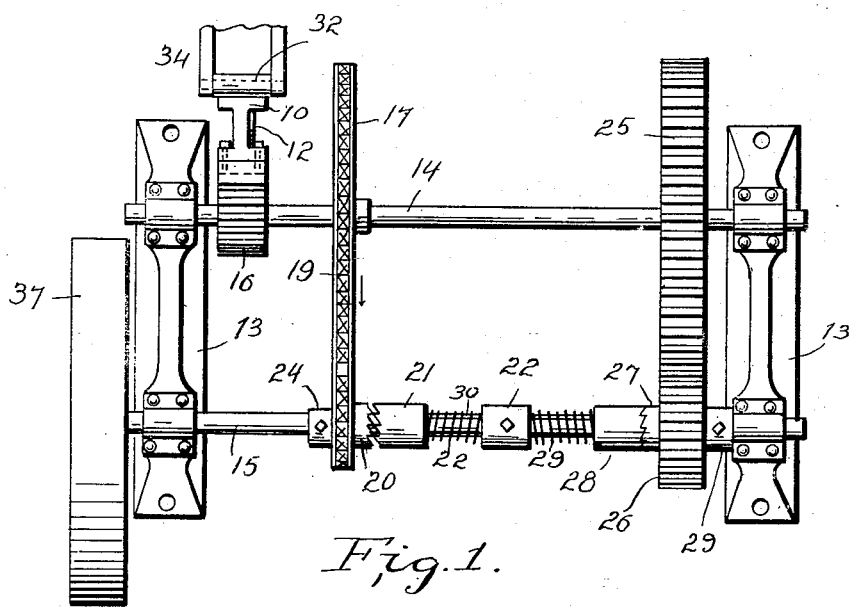
Fig. 1.
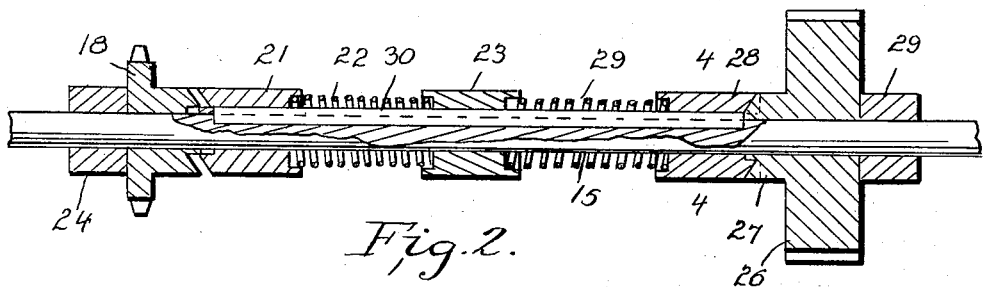
Fig. 2.
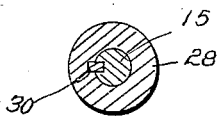
Fig. 3.
Witnesses
P. N. Jones.
E. H. Foster
Inventor
M. H. Dunham.
By 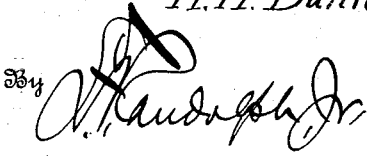
Attorney
THE NORRIS PETERS CO., PHOTO-LITHO., WASHINGTON, D. C.

UNITED STATES PATENT OFFICE.

MILES H. DUNHAM, OF SHEFFIELD, MASSACHUSETTS.

GEARING.

1,190,131.  Specification of Letters Patent.  Patented July 4, 1916.

Application filed May 6, 1913. Serial No. 765,941.

*To all whom it may concern:*

Be it known that I, MILES H. DUNHAM, a citizen of the United States, residing at Sheffield, in the county of Berkshire and State of Massachusetts, have invented certain new and useful Improvements in Gearing; and I do hereby declare the following to be a full, clear, and exact description of the invention, such as will enable others skilled in the art to which it appertains to make and use the same.

This invention relates to improvements in systems of gearing to be used in tide motors or for other purposes, said gearing being especially constructed to be used as that type of tide motors comprising a float which is raised and lowered by the water to drive a power generating mechanism.

One of the objects of the invention is to provide a system of gearing for a motor of this type which will generate power when it is being raised and lowered by the tide, said motor being of strong and durable construction.

Another object of the invention resides in the provision of a tide motor including a vertically movable float, a stationary rack standard extending through a vertical opening formed in the float, and means actuated by the rack standard whereby a generator may be driven continuously in one direction.

With these and other objects in view, as will become more apparent as the description proceeds, the invention consists in certain novel features of construction, combination, and arrangement of parts, as will be hereinafter described and claimed.

For a complete understanding of my invention, reference is to be had to the following description and accompanying drawings, in which, Figure 1 is a top plan view, showing the gearing, Fig. 2 is an enlarged sectional view on a plane through the driven shaft, Fig. 3 is a section taken on the plane of line 4—4 of Fig. 2.

Bearing members 13 are mounted upon the top of the float (not shown) and have the transverse drive and driven shafts 14 and 15, respectively, journaled thereon. Both of these shafts are disposed upon the toothed side of the rack standard and lie in the same horizontal plane. A relatively small gear 16 is rigid with the shaft 14 and meshes constantly with the teeth of the rack standard. In order that the shaft 15 may be driven continuously in one direction, I provide two sets of connections between the shafts 14 and 15. The first set which drives the shaft 15 when the float is descending includes a large sprocket gear 17 rigid with the shaft 14 and a small sprocket gear 18 loosely mounted upon the shaft 15. A sprocket chain 19 connects the two sprocket gears. The sprocket gear 18 is formed with a clutch member 20 having teeth which interlock with the teeth carried upon the sliding clutch member 21, which latter is splined upon the shaft 15 and forced toward the clutch member 20 by means of an expansive spiral spring 22 which surrounds the shaft 15 and which bears at one end against a collar 23 and at the other end against the clutch member 21. The opposed ends of the clutch member 21 and collar 23 are annularly recessed to receive the ends of the spring. A collar 24 is keyed to the shaft 15 upon the outside of the sprocket gear 18 and prevents the latter moving longitudinally in one direction. It will be seen that as the float is lowered, the sprocket chain 19 will travel in the direction of the arrow shown in Fig. 2 and causes the shaft 15 to be driven in the same direction by an interlocking of the clutch members. The oppositely facing teeth formed upon the clutch members ride over one another when the sprocket chain travels in the other direction and therefore no motion is imparted to the shaft 15.

A second set of connections between the shafts 14 and 15 which drives the last mentioned shaft when the float is being raised, includes a large gear 25 rigid with the shaft 14 and meshing with a smaller gear 26 loosely mounted upon the shaft 15. This last mentioned gear is formed with a clutch member 27 which engages a clutch member 28 splined upon the shaft 15. The expansive spiral spring 29 surrounding the shaft 15 by bearing against the collar 23 and clutch member 28 forces the latter toward the clutch member 27. As the float is being raised the shaft 14 is rotated in a clockwise direction and drives the shaft 15 in a counter-clockwise direction through the medium of the gear 26 and clutch members 27 and 28. When the float is being lowered, the teeth upon the clutch member 27 ride over those upon the clutch member 28 and no motion is imparted to the shaft 15 by the gear 26. A collar 29 is rigid with the shaft 15 and prevents the gear 26 moving longitudinally in one direction.

It will be noted that the collar 23 is placed between the clutch members 21 and 28 and serve as a stop for each of the spiral springs. The last mentioned clutch members are held against rotation relative to the shaft 15 by the key 30. The gear 16 is held in mesh with the rack standard by means of the idler rollers 31 and 32, which are mounted in the frames 33 and 34, respectively. These rollers engage that side of the rack standard which is opposite the toothed side and prevent the gear 16 moving away from engagement with the teeth of said standard. The frame 33 may be disposed within the float and the frame 34 is mounted upon the top of said float.

A generator 35 is mounted upon one end of the float and is driven continuously by a belt 36 which runs over the drive wheel 37 and is rigidly secured to the shaft 15. Wires 38 lead from the generator to the switch board 39 and wires 40 lead from the switch board to the storage batteries 41 which may be suitably located.

In operation, as the float is raised by the tide the shaft 15 is driven in a counter-clockwise direction by means of the second set of connections which includes the clutch members 27 and 28. When the float begins its downward movement these last mentioned clutch members become inoperative and the shaft 15 continues to be rotated in a counter-clockwise direction by means of the first set of connections described which includes the clutch members 20 and 21. It will thus be seen that the generator 35 is driven continuously in the same direction.

It is to be understood that while I have shown and described the preferred embodiment of my invention, I do not wish to be limited to this exact construction, combination, and arrangement of parts, but may make such changes as will fall within the spirit and scope of the invention.

Having thus described my invention, what I claim is:—

The herein described system of gearing for tide motors including a horizontal drive shaft, means for positively reversely rotating the drive shaft in opposite directions alternately, said means including a pinion fixed to the drive shaft and a vertically disposed reciprocatory rack bar meshing with the said pinion and rotating the drive shaft in one direction when it moves upwardly and in the opposite direction when it moves downwardly, a horizontal driven shaft disposed in parallelism with the drive shaft, and means for continuously rotating the driven shaft in one direction from the said reversely rotatable drive shaft, the last mentioned means comprising sprocket wheels mounted on the drive and driven shafts, a sprocket chain arranged on the sprocket wheels, spur gear wheels mounted on the said shaft and meshing with each other and spaced from the sprocket wheels and a pair of automatic clutches both mounted on the driven shaft and connecting the sprocket wheel and the spur wheel of the said driven shaft to the latter when the said sprocket wheel and spur gear wheels are rotated in a forward direction.

In testimony whereof I affix my signature in presence of two witnesses.

MILES H. DUNHAM.

Witnesses:
GEORGE W. PATTERSON,
CHARLES F. SHRAK.

Copies of this patent may be obtained for five cents each, by addressing the "Commissioner of Patents, Washington, D. C."